Patented Apr. 16, 1940

2,197,168

UNITED STATES PATENT OFFICE 2,197,168

MANUFACTURE OF ADHESIVES, SUCH AS WOOD GLUE

Eugen Abramowitsch, London, England

No Drawing. Application October 19, 1937, Serial No. 169,857. In Great Britain October 30, 1936

4 Claims. (Cl. 134—23.9)

This invention relates to the manufacture of adhesives such as wood glue, one object being to produce a glue or adhesive which will result in a water-resistant jointing material; another object is to produce a glue or adhesive specially suited for the veneer, plywood and other timber jointing trades.

It is known that with certain glues such as animal glue (gelatine) the action of formaldehyde at the appropriate time is to convert the glue into a horny mass which is resistant to water, and attempts have been made to use formaldehyde with casein glue but so far apparently without success.

Proposals have been made to use derivatives or products of formaldehyde such as hexamethylenetetramine, trioxymethylene and phenol-formaldehyde condensation products, as additions to casein glue, the idea being that formaldehyde would be liberated or rendered effective in the mixture, but it is difficult to control or determine the time at which such action will take place. If the action of formaldehyde on the casein glue is premature, thickening takes place before the distribution of the glue, but if the action of formaldehyde is delayed the desired water-resistance is not achieved.

There have also been other proposals; thus in British Patent Specification No. 128,690 it is proposed to mix casein with borax, water glass and tannic acid and, if it is desired to use the mixture in conjunction with formaldehyde, to apply the mixture to one side of a piece of paper and formaldehyde to the other; and in United States of America Patent No. 1,964,960 it is proposed to mix casein (to which ammonia or other alkaline substances may have been added preferably in a quantity to bring the mixture to a nearly neutral condition), water, a substance (such as ammonia sulphocyanate or thiourea) which with the water is a neutral solvent for the casein, and a proportion of an active aldehyde such as formaldehyde.

It has now been found that the difficulties hitherto encountered in adding formaldehyde to casein glues may be overcome, without special operation or the addition of special substances being necessary as in the prior proposals, by selecting special proportions for the casein, alkali and formaldehyde to obtain a substantially neutral product when the ingredients are mixed in cold water.

According to this invention the casein known as acid casein (produced by the action of certain acids such as lactic acid on casein-containing materials such as milk) is mixed with free formaldehyde, sodium or potassium hydroxide or one of their basic salts and water in proportions which may be calculated from the following table:

1,000 grams casein (iso-electric)
    0.2–1 gram-molecule of formaldehyde
    0.3–1 gram-equivalent of sodium or potassium hydroxide or one of their basic salts
    at least sufficient water to give a liquid product.

The term "basic salts" is to be understood as meaning salts of sodium or potassium which will develop hydroxyl ions in solution, for example sodium carbonate, potassium carbonate, potassium phosphate, water glass and other sodium and potassium salts of weak acids.

In preparing a glue in accordance with the present invention, the casein in powdered form may be mixed with water in the proportion of one part of casein to 2–10 parts of water, preferably one part of casein to about four parts of water, and the two other constituents are then added together or separately and the whole mass stirred to form the glue. In some cases it will be found convenient to make up a powder comprising the casein and the sodium or potassium hydroxide or basic salt and, when it is desired to make the glue, the powder is stirred up in the requisite amount of water and the formaldehyde added. Wood glue produced in accordance with the present invention can be used up to twenty-four hours after preparation to give a water-resisting jointing material.

Glue prepared in accordance with the invention also has various other practical advantages. It is free from the tendency of other casein glues to produce stains on veneers, particularly those of wood containing tannic acid. Further it does not attack the skin of the operatives and the finished glue possesses marked strength under heat and has a remarkably high water-resistance.

The invention is illustrated by the following specific example of one method of producing a wood glue in accordance with the present invention:

100 grams of powdered casein (iso-electric) are stirred up with 400 grams of water. 25 grams of water glass (37 to 40 Beaumé) are then stirred in, and finally 7 grams of a 30% formaldehyde solution are added and the whole stirred to give a glue ready for use.

The proportion of the various constituents may be varied within the limits given above in accordance with the thickness and water resistance desired.

I claim:

1. A process for the production of a casein glue having a substantially neutral reaction and capable of use for at least twenty-four hours after preparation comprising stirring casein with water, stirring in a compound selected from the group consisting of sodium hydroxide, potassium hydroxide, basic salts of sodium and basic salts of potassium and finally stirring in free formaldehyde the ingredients being employed in such amounts that their relative proportion in the final product may be calculated from the following table:

1,000 grams casein (iso-electric)
0.2–1 gram-molecule of formaldehyde
0.3–1 gram-equivalent of a compound selected from the group consisting of sodium hydroxide, potassium hydroxide, basic salts of sodium and basic salts of potassium
at least sufficient water to give a liquid product.

2. A process for the production of a liquid casein glue having a substantially neutral reaction and capable of use for at least twenty-four hours comprising mixing powdered casein and a compound selected from the group consisting of sodium hydroxide, potassium hydroxide, basic salts of sodium and basic salts of potassium and subsequently stirring the powder with water and then adding free formaldehyde, the ingredients being employed in such amounts that their relative proportion in the final product may be calculated from the following table:

1,000 grams casein (iso-electric)
0.2–1 gram-molecule of formaldehyde
0.3–1 gram-equivalent of a compound selected from the group consisting of sodium hydroxide, potassium hydroxide, basic salts of sodium and basic salts of potassium
at least sufficient water to give a liquid product.

3. A process for the production of a casein glue having a substantially neutral reaction and capable of use for at least twenty-four hours after preparation, comprising stirring casein with water, stirring in a compound selected from the group consisting of sodium hydroxide, potassium hydroxide, basic salts of sodium and basic salts of potassium and finally stirring in free formaldehyde the ingredients being employed in such amounts that their relative proportion in the final product may be calculated from the following table:

1,000 grams casein (iso-electric)
0.2–1 gram-molecule of formaldehyde
0.3–0.7 gram-equivalent of a compound selected from the group consisting of sodium hydroxide, potassium hydroxide, basic salts of sodium and basic salts of potassium
at least sufficient water to give a liquid product.

4. A process for the production of a liquid casein glue having a substantially neutral reaction and capable of use for at least twenty-four hours, comprising mixing powdered casein and a compound selected from the group consisting of sodium hydroxide, potassium hydroxide, basic salts of sodium and basic salts of potassium and subsequently stirring the powder with water and then adding free formaldehyde, the ingredients being employed in such amounts that their relative proportion in the final product may be calculated from the following table:

1,000 grams casein (iso-electric)
0.2–1 gram-molecule of formaldehyde
0.3–0.7 gram-equivalent of a compound selected from the group consisting of sodium hydroxide, potassium hydroxide, basic salts of sodium and basic salts of potassium
at least sufficient water to give a liquid product.

EUGEN ABRAMOWITSCH.